(12) United States Patent
Aryanfar et al.

(10) Patent No.: US 9,606,223 B2
(45) Date of Patent: Mar. 28, 2017

(54) HIGH-ACCURACY AND LOW-POWER TRACKING SYSTEM FOR MOBILE DEVICES

(75) Inventors: Farshid Aryanfar, Sunnyvale, CA (US); Marko Aleksić, Mountain View, CA (US); Kambiz Kaviani, San Francisco, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 544 days.

(21) Appl. No.: 14/235,783

(22) PCT Filed: Aug. 1, 2012

(86) PCT No.: PCT/US2012/049139
§ 371 (c)(1),
(2), (4) Date: Jan. 28, 2014

(87) PCT Pub. No.: WO2013/019847
PCT Pub. Date: Feb. 7, 2013

(65) Prior Publication Data
US 2014/0176365 A1    Jun. 26, 2014

Related U.S. Application Data

(60) Provisional application No. 61/514,973, filed on Aug. 4, 2011.

(51) Int. Cl.
*G01S 5/02* (2010.01)
*G01S 13/00* (2006.01)
(Continued)

(52) U.S. Cl.
CPC .............. *G01S 13/00* (2013.01); *G01S 7/352* (2013.01); *G01S 13/424* (2013.01); *G01S 13/756* (2013.01)

(58) Field of Classification Search
CPC . G01S 5/02; G01S 7/352; G01S 13/00; G01S 13/424; G01S 13/756
(Continued)

(56) References Cited

U.S. PATENT DOCUMENTS

2008/0278369 A1    11/2008  Milano
2012/0289338 A1*   11/2012  Chen ..................... A63F 13/235
                                                        463/39

OTHER PUBLICATIONS

Corrected International Search Report dated Feb. 1, 2013 re International Application No. PCT/US2012/049139. 6 pages.
(Continued)

*Primary Examiner* — Harry Liu
(74) *Attorney, Agent, or Firm* — Fenwick & West LLP (57) ABSTRACT

An electronic device for wirelessly tracking the position of a second electronic device is disclosed. The electronic device includes transceiver circuitry having a beacon generator to generate a beacon at a particular frequency and direction. An antenna array transmits the beacon, and receives at least one reflected beacon from the second electronic device. The reflected beacon is received if a position of the second electronic device lies within a range of directions of the beacon. The transceiver circuitry further includes an injection-locked oscillator having an input coupled to the antenna array to receive reflected beacons, and to lock to the reflected beacon when the reflected beacon has a frequency value within locking range of the oscillator. Processing circuitry coupled to the transceiver circuitry tracks the position of the second device based on the lock condition of the oscillator.

19 Claims, 11 Drawing Sheets

(51) Int. Cl.
   *G01S 7/35*   (2006.01)
   *G01S 13/42*   (2006.01)
   *G01S 13/75*   (2006.01)

(58) Field of Classification Search
   USPC .......................................................... 342/369
   See application file for complete search history.

(56) References Cited

OTHER PUBLICATIONS

Hoeye et al., "Receiving Phased Antenna Array Based on Injection-Locked Harmonic Self-Oscillating Mixers," IEEE Transactions on Antennas and Propagation, IEEE Service Center, Piscataway, NJ, US, vol. 57, No. 3, Mar. 1, 2009, pp. 645-651, XP011254689, ISSN: 0018-926X. 7 pages.

Stephan, Karl D., "Inter-Injection-Locked Oscillators with Applications to Spatial Power Combining and Phased Arrays," Microwave Symposium Digest, 1986 IEEE MTT-S International, IEEE, Piscataway, NJ, USA, Jun. 2, 1986, pp. 159-162, XP031668105. 4 pages.

PCT Written Opinion, PCT Application No. PCT/US2012/049139, Dec. 14, 2012, 9 pages.

\* cited by examiner

HIGH-ACCURACY AND LOW-POWER TRACKING SYSTEM FOR MOBILE DEVICES

CROSS-REFERENCE TO RELATED APPLICATIONS/TECHNICAL FIELD

Pursuant to 35 U.S.C. §365, this application claims priority from International Application No. PCT/US2012/049139 published as WO 2013/019847 A1 on Feb. 7, 2013, which claims priority from U.S. Provisional Application No. 61/514,973, filed Aug. 4, 2011 and entitled "HIGH-ACCURACY AND LOW-POWER TRACKING SYSTEM FOR MOBILE DEVICES". International Application No. PCT/US2012/049139 and U.S. Provisional Application No. 61/514,973 are hereby incorporated by reference in their entirety.

TECHNICAL FIELD

The disclosure herein relates to wireless communication systems and methods and more particularly to mm-wave tracking systems and methods that establish the location of a target electronic device with respect to a tracking electronic device.

BACKGROUND

Millimeter-wave signaling links are gaining in popularity, especially in the wireless context. Corresponding to operating frequencies in the range of around 30 to 300 GHz, transmission and reception of RF signals along the links are often realized through use of directional antennas. Such antennas are capable of steering beams between devices to effect data communications over the resulting wireless link.

When employed in a mobile device, conventional directional antenna configurations typically exhibit limited sizes due to the constraints imposed by the device size. Generally, this results in an antenna configuration that projects a relatively flat wavefront along its maximum radiation direction. This generally complicates tracking and often involves the use of high-resolution power measurements in order to achieve acceptable angular resolution.

Unfortunately, directional antenna schemes based on high-resolution power measurements often exhibit poor sensitivity characteristics. Moreover, they consume large amounts of power which may be undesirable for mobile device applications. Thus, the need exists for directional antenna configurations for mobile device applications that exhibit high-sensitivity with low-power consumption.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of an electronic device for wirelessly tracking the position of a second electronic device are disclosed. In one embodiment, the electronic device includes transceiver circuitry having a beacon generator to generate a beacon at a particular frequency and direction. An antenna array transmits the beacon, and receives at least one reflected beacon from the second electronic device. The reflected beacon is received if a position of the second electronic device lies within a range of directions of the beacon. The transceiver circuitry further includes an injection-locked oscillator having an input coupled to the antenna array to receive reflected beacons, and to lock to the reflected beacon when the reflected beacon has a frequency value within locking range of the oscillator. Processing circuitry coupled to the transceiver circuitry tracks the position of the second device based on the lock condition of the oscillator.

In a further embodiment, a wireless link for establishing the position of a second device with respect to a first device is disclosed. The wireless link includes a first device that includes a first transceiver circuit that has a beacon generator to generate the beacon at a particular frequency and direction. And a second transceiver circuit in the second device including a reflective antenna to receive a beacon of a beacon frequency from a first direction and reflect the beacon as a reflected beacon in the opposite direction. An antenna on first device transmits the beacon and, where the second device lies within a range of directions of the beacon, receives and reflects the beacon. The first device further includes an injection-locked oscillator having an input coupled to the antenna to lock to the reflected beacon when the reflected beacon has a frequency value within a locking range of the oscillator.

In yet another embodiment, a method of tracking a second electronic device with respect to a first electronic device is disclosed. The method includes setting an oscillator signal for an injection-locked oscillator to a natural frequency value. A beacon is then transmitted at a beacon frequency value. The beacon frequency value is different from the natural frequency value by an offset value. A reflected beacon is then received, corresponding to the transmitted beacon, when the second electronic device lies within a range of directions of the beacon. The received reflected beacon is injected into the injection-locked oscillator. The oscillator locks to the reflected beacon when the reflected beacon has a frequency value within a locking range of the oscillator.

System Overview

Figure 1:
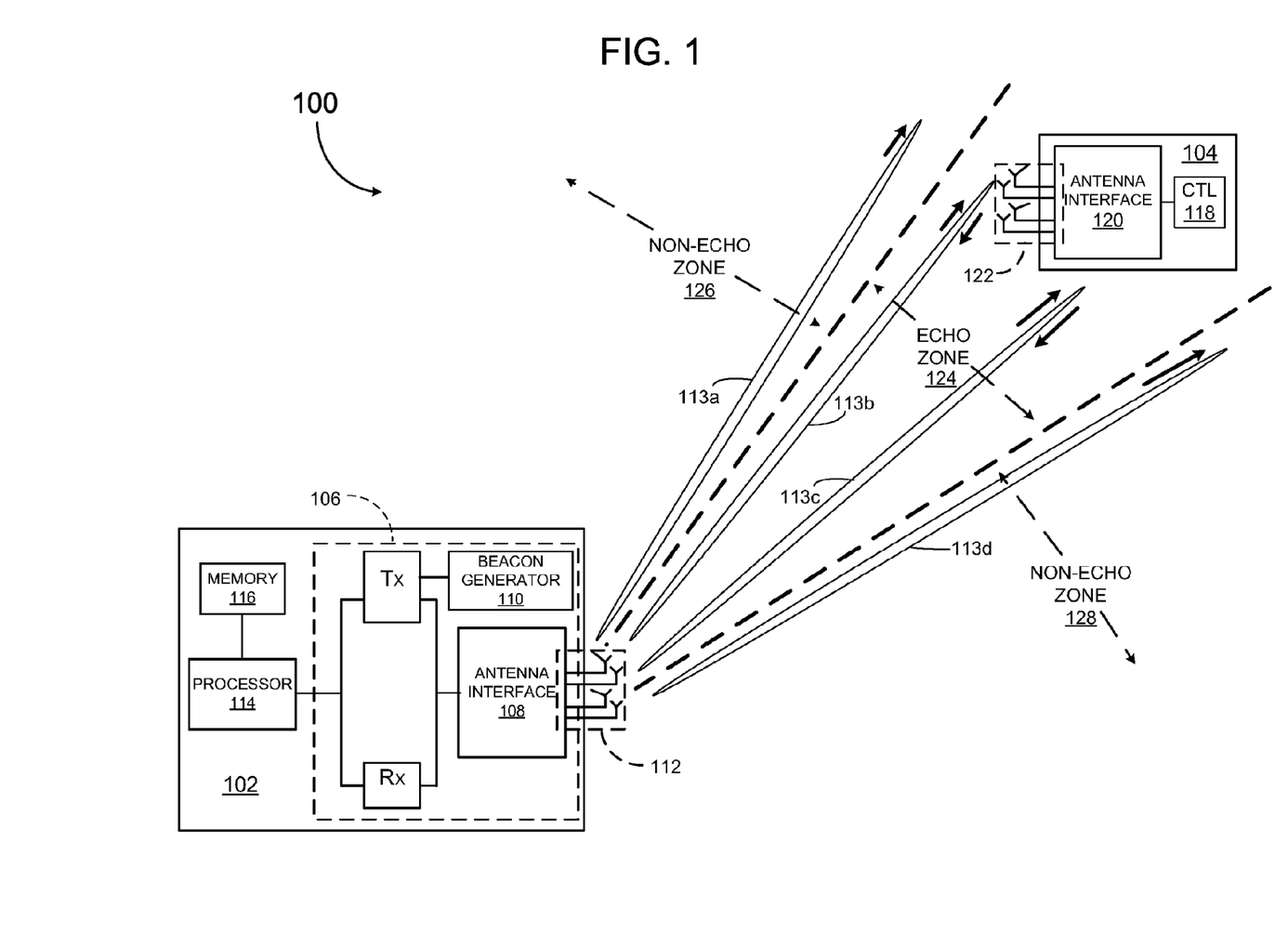
FIG. 1 illustrates a block diagram of one embodiment of a tracking system employing a target device and a tracking device.

Referring now to FIG. 1, one embodiment of a wireless device tracking system, generally designated 100, includes a tracking device 102 that wirelessly tracks the position of a target device 104. The tracking device 102 in one embodiment comprises a game console unit that employs transceiver and antenna circuitry 106 to emit and receive reflected waveforms that are realized in one embodiment as beacons. The beacons, also often referred to as "pilots", are steered beams having a defined carrier frequency and one or more directional components. In specific embodiments, the carrier frequencies correspond to mm-wave wavelengths. The transceiver and antenna circuitry 106 employs transmit circuitry Tx and receiver circuitry Rx to carry out respective transmit and receive operations via an antenna interface 108. Coupled to the antenna interface 108 is a beacon generator 110 that generates a beacon for emission at a desired frequency and direction by the antenna interface 108. An antenna 112 connects to the antenna interface 108 and emits the generated beacons, and receives reflected beacons. Computer processing resources in the form of a processor 114 such as a central processing unit (CPU) or a graphics processing unit (GPU) couples to the transceiver and antenna circuitry 106 to carry out compute tasks in response to software loaded into a memory 116. Further memory may interface with the processor 114 to provide additional data storage capabilities for information such as direction and offset frequencies relating to received beacons.

Further referring to FIG. 1, the target device 104 in one embodiment comprises a mobile device, such as a hand-held game controller or mobile phone. The target device 104 employs a control circuit 118 that couples to an antenna interface 120. An antenna 122 connects to the antenna interface to, in one embodiment, redirect or reflect beacons emitted from the tracking device 102 back to the target device 104 as noted below.

With continued reference to FIG. 1, in a transmit mode, the tracking device antenna 112 emits beacons 113a-113d at various directions and frequencies as governed by the beacon generator 110 and antenna interface 108. Generally, beacons transmitted within a range of directions generally spanning a line-of-sight path between the tracking device 102 and the target device 104, referred to as an echo zone 124, are reflected back to the tracking device 102 and, in a receive mode, provide directional information concerning the target device as explained more fully below. Beacons transmitted outside the echo zone, in areas denoted non-echo zones 126 and 128, are not directly reflected by the target device, and provide little to no target direction information.

Figure 2A:
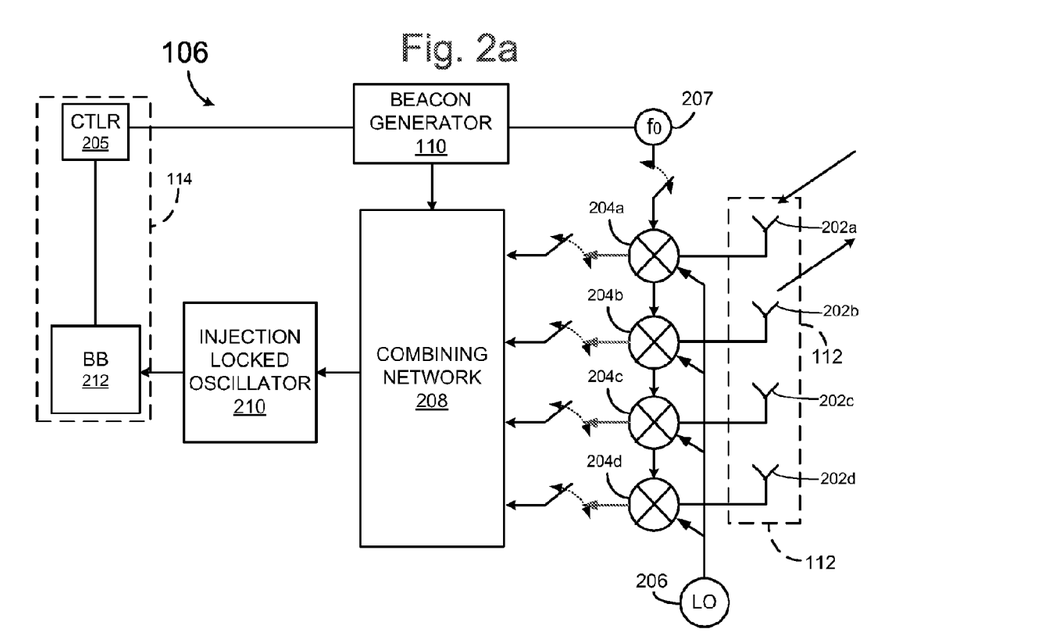
FIG. 2*a* illustrates a block diagram of one embodiment of transceiver circuitry and antenna interface circuitry within the tracking electronic device of FIG. 1.

FIG. 2a illustrates further detail regarding the transceiver and antenna circuitry 106 of FIG. 1. The antenna 112 in one embodiment takes the form of a directional antenna that incorporates a multi-dimensional array of antenna elements 202a-202d, defining a phased array antenna. Unlike omni-directional antennas that have a uniform gain in all directions, a directional antenna has a different antenna gain in each direction. The elements may be configured to, for example, output and/or receive signals in a 7 GHz frequency band centered on 60 GHz (or on a frequency range between 30 and 300 GHz). While the entire phased array antenna may be monolithically formed on an integrated circuit chip, the antenna array 112 may be disposed external to the transceiver and antenna circuitry 106, formed on-chip, on a chip package, on an interposer, or chip carrier, on substrate, and/or on another integrated circuit (for example, in a chip stack).

Further referring to FIG. 2a, a plurality of mixers 204a-204d are respectively coupled to the plurality of antenna elements 202a-202d. The mixers 204a-d are coupled to a local oscillator 206 that generates a local oscillator signal at an oscillation frequency $f_{LO}$. A reference signal generator 207 produces a reference signal having a frequency f0 and feeds the signal to the mixers in a manner similar to the local oscillator signal, but phase-shifted by a controlled amount to each mixer.

Figure 2B:
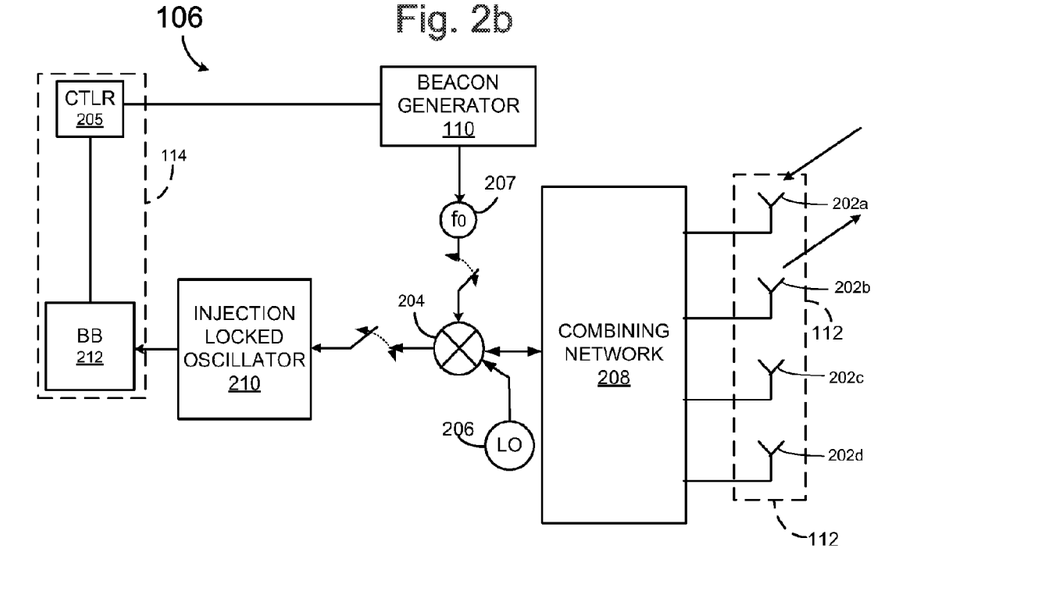
FIG. 2*b* illustrates a block diagram of a further embodiment of transceiver circuitry and antenna interface circuitry similar to FIG. 2*b*.

Alternatively, as shown in FIG. 2b, one mixer 204 is coupled to the plurality of antenna elements 202a-202d through the combining network. The mixer 204 is coupled to a local oscillator 206 that generates a local oscillator signal at an oscillation frequency fLO. A reference signal generator 207 produces a reference signal having a frequency f0 and feeds the signal to the mixers in a manner similar to the local oscillator signal. The combining network in this case applies a controlled amount of phase-shift between the mixer and each antenna element 202a-202d.

During transmission modes of operation, the mixers 204a-d are coupled to the beacon generator 110. The beacon generator generates beacons and directional components in response to a controller circuit 205 that in one embodiment forms a portion of the processor resources 114 of FIG. 1. For reflected beacon reception, the mixers 204a-d combine the received RF carrier signal with the local oscillation signal $f_{LO}$ to generate a signal exhibiting an intermediate frequency $f_{IF}$ that may be of a lower frequency than the carrier frequency, such as a beat frequency of the carrier frequency and local oscillator frequency, and thus more easily handled from a processing standpoint.

With continued reference to FIG. 2a, in one embodiment the mixers 204a-d are selectively coupled to a combining network 208, depending on whether the antenna is operating in a transmit or receive mode. The combining network in a receive mode, generally takes the intermediate frequency receive signals from the mixers 204a-d, and combines the separate phase components from the different antenna elements into a composite waveform based on calibration coefficients stored in a memory, such as a look-up table, or data storage 116. In a transmit mode, the combining network 208 receives directional components from the beacon generator and acts to effectively steer the orientation of signal transmission by assigning a different phase angle offset to signals transmitted by each of the antenna elements 202a-d. In some embodiments, the combining network 208 may be simplified or altogether omitted by including circuitry within the mixers 204a-d to carry out the phase shifting functionality.

Disposed at a receive output of the combining network 208 is an injection-locked oscillator (ILO) 210. The ILO generally employs for example a cross-coupled oscillator or ring oscillator (not shown) as is well-known in the art, with a natural resonant frequency $f_{ILO}$. The ILO includes an input for receiving waveforms representing reflected beacon signals and an output signal to the baseband processor (BB) 212. BB indicates whether the ILO is "locked" (substantially matched the frequency of the ILO resonant frequency) received waveform. Baseband processor 212 may be realized by the processing circuitry resources 114 described earlier and coupled to the controller circuit 205.

Figure 3:
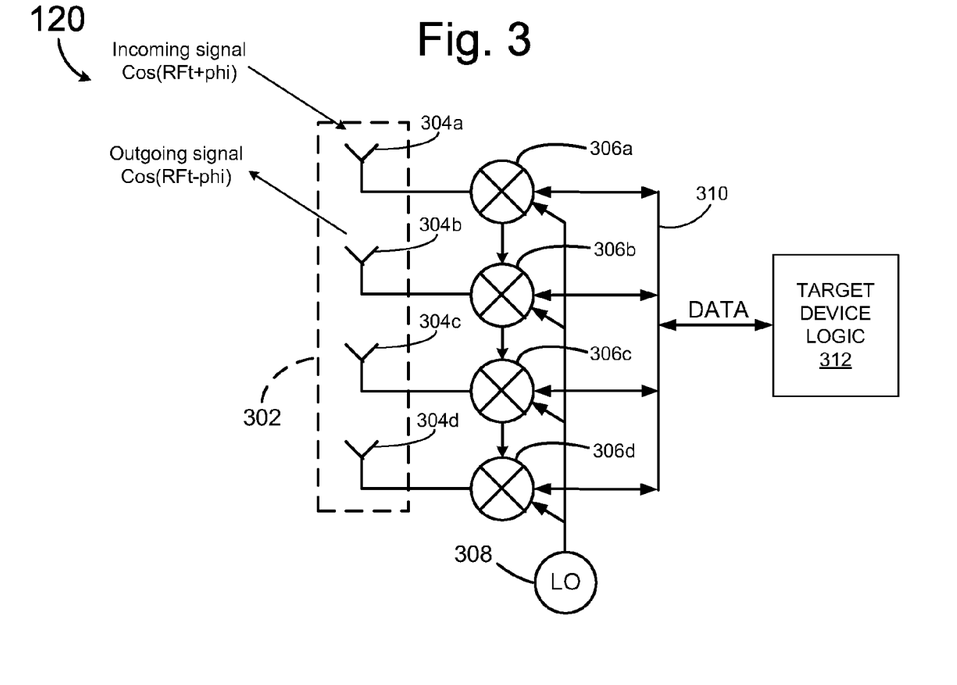
FIG. 3 illustrates a block diagram of one embodiment of a retro-directive antenna array employed in the target device of FIG. 1.

Referring now to FIG. 3, one embodiment of the antenna interface 120 of the target device 104 includes a special form of phased array antenna capable of reflecting a received signal back to the signal source. In one embodiment, a retro-directive array 302 is employed that includes an array of antenna elements 304a-d configured similar to that of the console antenna 112, with a geometric layout optimized for a desired directivity parameter. Unlike the fully steerable console antenna, however, the retro-directive array employs active phase conjugation circuitry. An exemplary phase conjugation circuitry is shown in the form of respective mixers 306a-d that each tie-in to a local oscillator 308. Data distribution circuitry 310 couples the mixers to target device logic 312. In one embodiment, the target device logic 312 comprises a low-power processing engine that operates at a relatively low data rate. Like the console antenna, signals received at each antenna element are offset by a phase that is a function of direction of the received beam. In the exemplary implementation, by setting the local oscillator frequency to twice the incoming RF carrier frequency, the antenna reflects an incoming signal back to the signal source in accordance with the following approximations:

$$V_{out} = V_{in} \cos(\omega_{RF}t + n\phi) \times V_{LO} \cos(2\omega_{RF}t) = \frac{1}{2} V_{in} V_L \cos(\omega_{RF}t - n\phi) + \frac{1}{2} V_{in} V_{LO} \cos(3\omega_{RF}t + n\phi)$$

The second component of the expanded equation may be discarded using filtering since its center frequency is a harmonic of the leading component center frequency. The result is an automatic phase conjugation of the incoming signal that essentially redirects the incoming signal back from where it originated.

In operation, the wireless tracking system 100 takes advantage of the observation that signals reflected from a target that are associated with a maximum frequency offset from the ILO resonant frequency provide an accurate positional detection mechanism. Moreover, by employing a form of frequency detection, small differences in frequency may be detected, corresponding to higher measurement sensitivity. Further, by avoiding the use of power-hungry high resolution digital circuitries that are normally used for power-detection schemes, significant power savings are realized.

Figure 4:
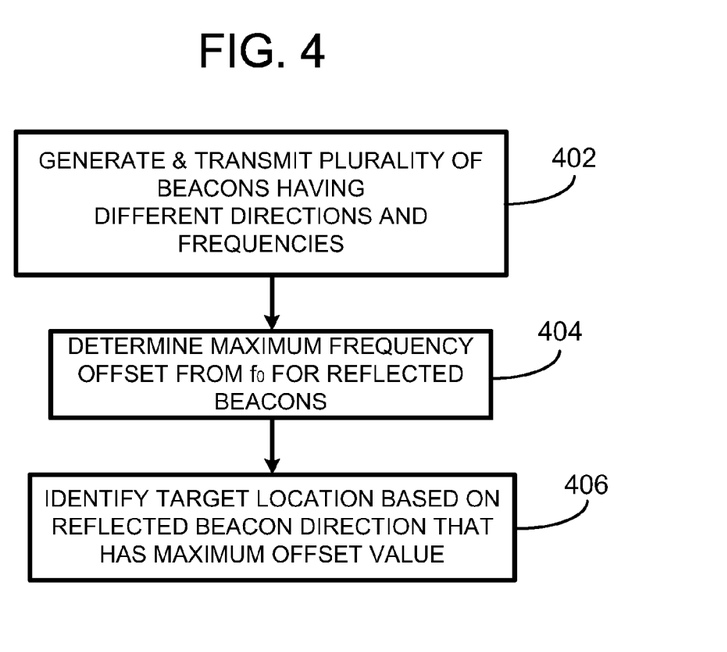
FIG. 4 illustrates a high-level flow diagram of a method of searching for a target device based on received frequency information at lock position (after initial search of finding target)

In one embodiment, high-level operations between the tracking device 102 and the target device 104 are set out by the flowchart of FIG. 4. Generally, the tracking device 102 carries out a search algorithm that involves iteratively generating and transmitting a plurality of beacons having different directions and carrier frequencies, at step 402. Sets of beacons may be generated sequentially or concurrently. Beacons that are transmitted within a range of directions corresponding to a line-of-sight path intersecting the target device 104 (within the echo zone 124) are reflected back to the tracking device 102 by the target device antenna 122. The tracking device then determines the beacon associated with a maximum frequency offset from the ILO natural frequency $f_{ILO}$, at step 404. The target device location is then identified based on the reflected beacon direction that has the maximum offset frequency value while still locking to the ILO, at step 406. In this way, tracking based on frequency detection may be realized, which provides a high level of detection sensitivity with lower power dissipation.

Figure 5:
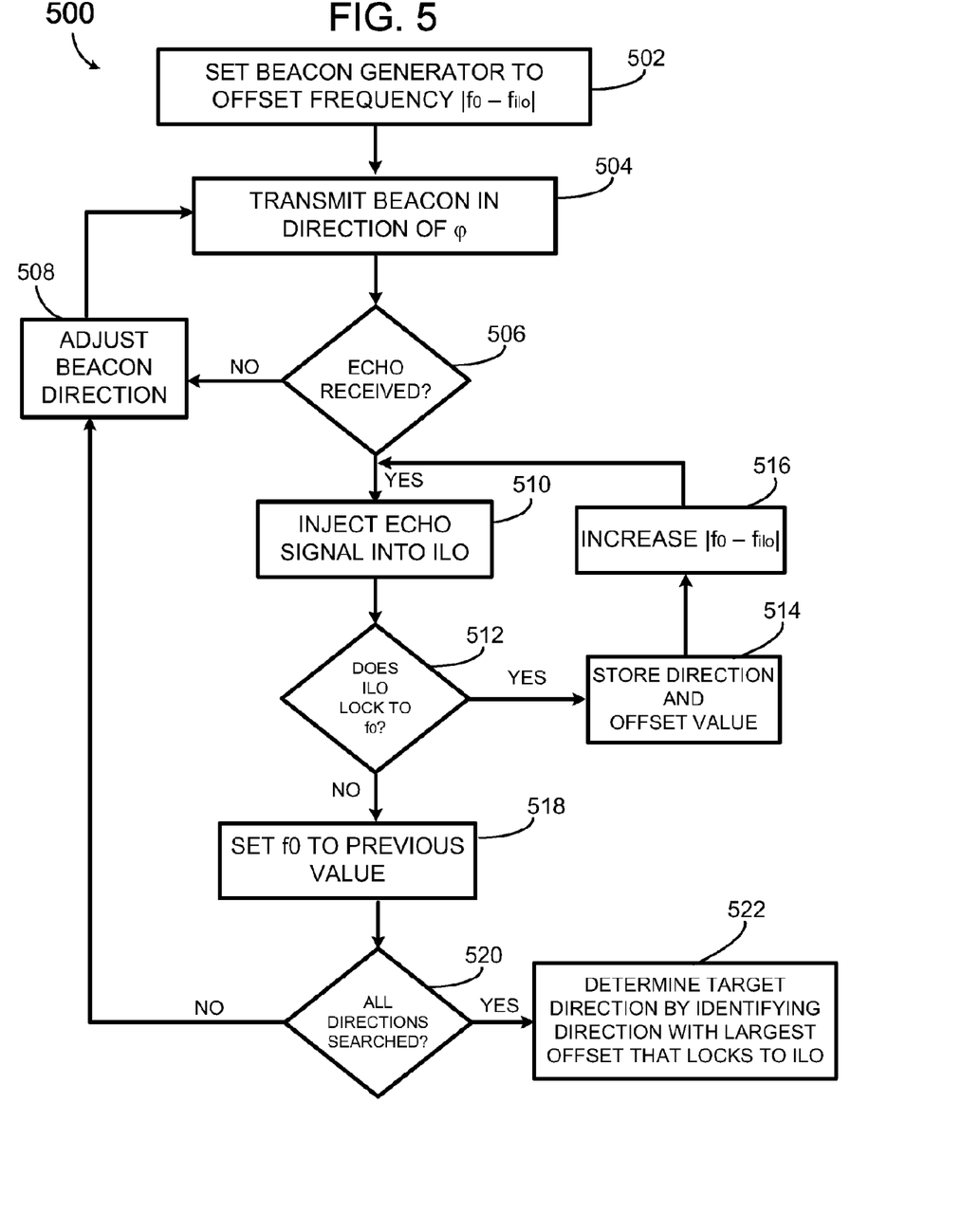
FIG. 5 illustrates a flow diagram of one embodiment of a method of searching for a target device utilizing an injection-locked oscillator.

FIG. 5 illustrates a flowchart that illustrates one embodiment of a more detailed search method, generally designated 500, consistent with that described above and set forth in FIG. 4. The method begins by setting the beacon generator 110 to produce a beacon at a selectable carrier frequency $f_0$ that results in an offset frequency from the ILO of $|f_0 - f_{ILO}|$, at step 502. In one embodiment, the first iteration of setting the offset frequency is done in a manner that guarantees a "locking" condition of the ILO 210. This may be done by setting the carrier frequency at or very close to the ILO frequency. The generated beacon is then transmitted in a direction $\phi_1$, at step 504. A determination is then made, at step 506, as to whether an echo associated with the transmitted beacon was received within an expected time interval, representing a beacon reflected from the target device 104. If no reflection is received, then the beacon direction is adjusted by a selectable increment, at step 508, and the transmit and echo evaluation steps 504 and 506 repeated. The direction incrementing and echo evaluation steps continue in a loop until an echo is received.

Further referring to FIG. 5, once a reflection is received, at step 506, then an intermediate frequency (IF) representation of the beacon reflection is injected into the ILO 210, at step 510. If the ILO locks to the injected input, at step 512, then the direction and frequency offset values corresponding to the reflected beam are stored to a register or other form of memory, at step 514. The beacon generator 110 is then directed to produce a subsequent beacon having an incrementally larger frequency offset, at step 516. The resulting reflection is then fed to the ILO, at 510. In effect, once a direction is identified that corresponds to an ILO lock, the carrier frequency $f_0$ is iteratively adjusted to expand the frequency offset from the ILO until the ILO 210 fails to lock. The frequency offset associated with that beacon direction will later be evaluated against other beacons having different directions and offsets to determine the most accurate target device direction (location).

Where the ILO 210 doesn't lock to the injected input, the reflected beacon is essentially ignored, and the beacon generator reset to the previous value of $f_0$, at step 518. A determination is then made, at step 520, as to whether all of the available directions for the given frequency offset have been searched. If not, then the beacon direction is adjusted to a new direction, at step 508, and the transmit step repeated, at step 504. If all of the directions have been searched, at step 520, then the target direction is determined, at step 522, by reading from memory the stored beacon information, and identifying the beacon direction with the largest offset that locked to the ILO 210.

Using millimeter-waves for communicating between the tracking and target devices described herein provides for relatively high antenna gain in dimensions on the millimeter scale. Millimeter-waves are broadly defined as in the 30 GHz-300 GHz range. The short wavelength allows very fine angular resolution for position detection and tracking. Moreover, from a regulatory perspective, a wide unlicensed bandwidth on the order of 7 GHz (centered at 60 GHz) is conveniently available for game play. Using this spectrum a range resolution on the order of around 1-2 inches is achievable using straightforward Fast Fourier Transform (FFT) techniques. Further advantages with millimeter-wave signaling involve, for example, low multi-path effects, efficient post-processing schemes and robust detection methods.

Figure 6:
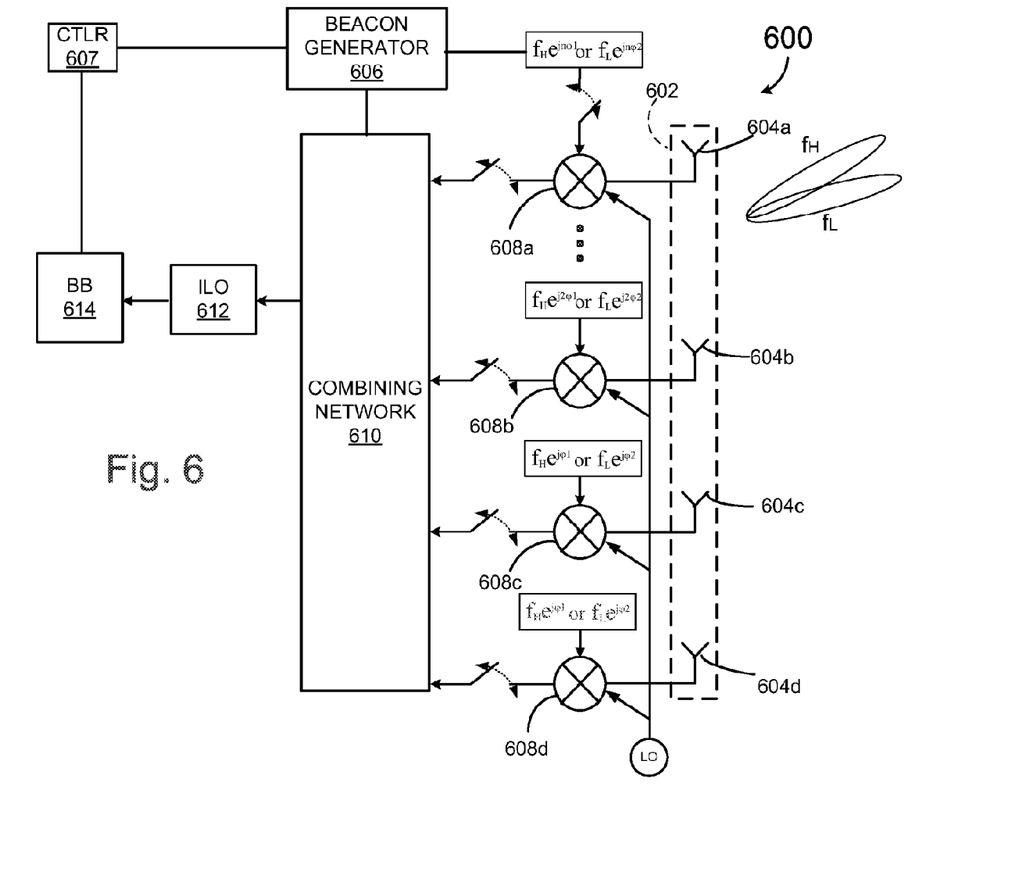
FIG. 6 illustrates a further embodiment of a transceiver and antenna interface circuit similar to FIG. 2, but utilizing time-multiplexed pairs of beacons.

FIG. 6 illustrates an alternative embodiment of a transceiver circuit and antenna interface, generally designated 600, for use with a wireless tracking device similar to that illustrated in FIG. 2. The alternative transceiver circuit and antenna interface employs the capability to transmit and receive over multiple frequencies $f_H$ and $f_L$. In one specific embodiment, transmission and reception is carried out in an interleaved manner over consecutive transmit and/or receive timeslots. Other embodiments may, for example, transmit the multiple frequencies beacons simultaneously. The circuit 600 includes an antenna 602 that in one embodiment includes a plurality of antenna elements 604a-604d that cooperate to form a directional beam antenna array. For beacon transmission, the circuit 600 employs a beacon generator 606 responsive to a controller 607 to, in one embodiment, generate pairs of interleaved beacons corresponding to the different carrier frequencies $f_H$ and $f_L$, and having different directional components. The antenna elements 604a-d are coupled to respective mixers 608a-608d that mix a local oscillator signal having a frequency $f_{LO}$ with received beacon reflections having carrier frequencies such as $f_H$ or $f_L$. The resulting intermediate frequency IF signals are output from the respective mixers 608a-608d into a combining network 610. The combining network 610 includes a receive output that feeds an ILO 612, which takes a reflected beacon as injection input and passes an output signal to a processing circuit, such as a baseband processor 614 to determine "lock/not locked" condition.

In FIG. 6, a similar implementation to that of FIG. 2b can be used where only one mixer is used and the combining network performs the phase shifting operation.

Figure 7:
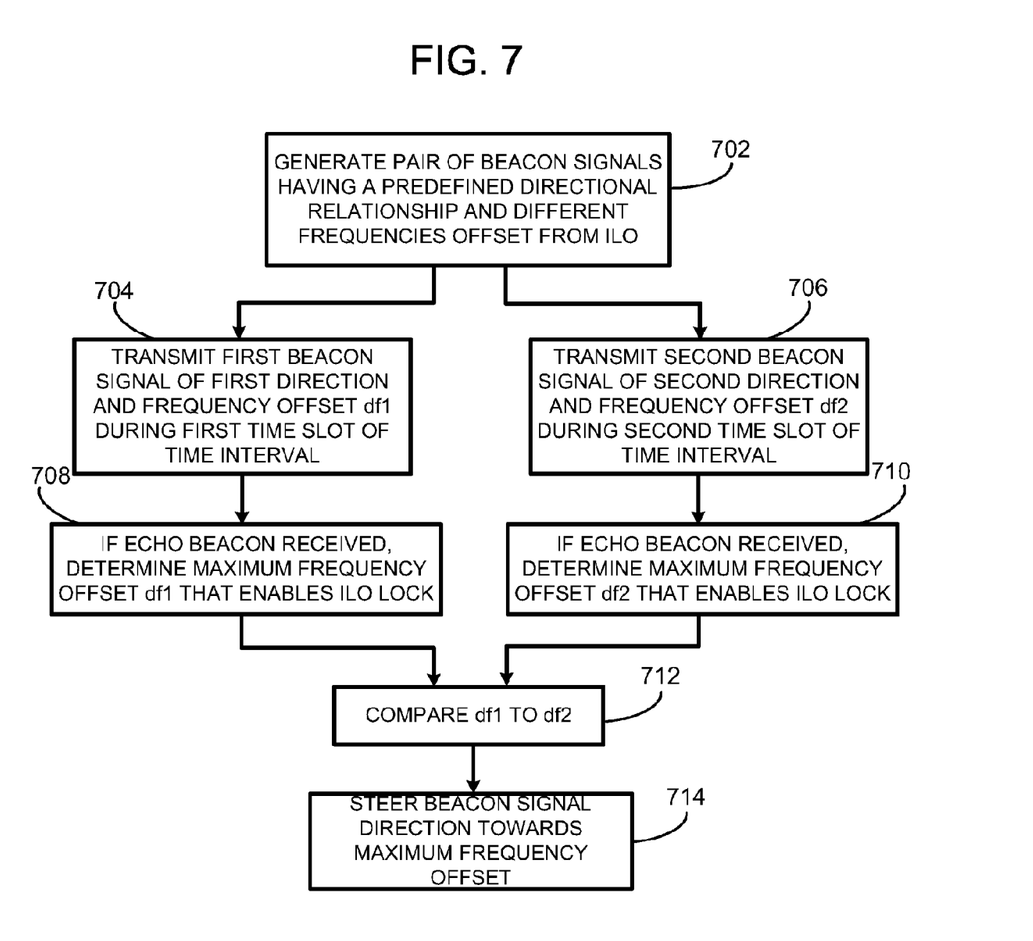
FIG. 7 illustrates a flow diagram of a target location search method similar to FIG. 4, but utilizing the transceiver and antenna interface circuitry of FIG. 6.

In operation, the transceiver circuit and antenna interface 600 carries out a search algorithm to determine the location of a target device. FIG. 7 illustrates a high-level flowchart setting forth steps employed for one embodiment of the search algorithm. At step 702, a pair of beacon signals are generated having respective predefined directional relationships and different frequency offsets from the ILO frequency $f_{ILO}$. A first beacon of a first direction $\phi_1$ and frequency offset df1 (df1 representing the magnitude of the difference between $f_0$ and $f_{ILO}$) is transmitted by the antenna array 602 during a first time slot of a given time interval, at step 704. Immediately following the first beacon transmission, a second beacon is transmitted having a second associated direction $\phi_2$ and frequency offset df2 during a second time slot of the time interval, at step 706. For the first beacon, if a corresponding echo or reflection beacon is received from the target device, at step 708, the reflection is injected into the ILO, and a determination is then made as to whether the ILO locked to the frequency of the reflection, (similar to steps 510 and 512 illustrated in FIG. 5). If a lock condition occurs, then the beacon direction and offset value is stored, and an incrementally larger offset value for a new beacon is set, (similar to steps 514 and 516 illustrated in FIG. 5). If a locking condition does not occur, then the beacon frequency is set to a previous value, and a determination of available beacon directions for searching is evaluated, (similar to steps 518 and 520 illustrated in FIG. 5).

In an interleaved or time-multiplexed manner, determining the first offset value df1 is carried out in a sequence that also determines whether a reflection from the second beacon was received, and determining the maximum frequency offset df2 that enables ILO lock, at step 710, similar to the steps above for the first reflected beacon. Once the two beacon carrier frequency offset values df1 and df2 are determined, a comparison is made, at step 712, to detect which offset value is larger, indicating a higher strength for reflected signal. The results of the comparison are then used to steer a new set of beacons in the direction of the beacon that had the higher frequency offset value, at step 714. This process iterates until a convergence to a particular beacon direction occurs, where df1 and df2 are substantially equal, which corresponds to the location of the target device.

Figure 8:
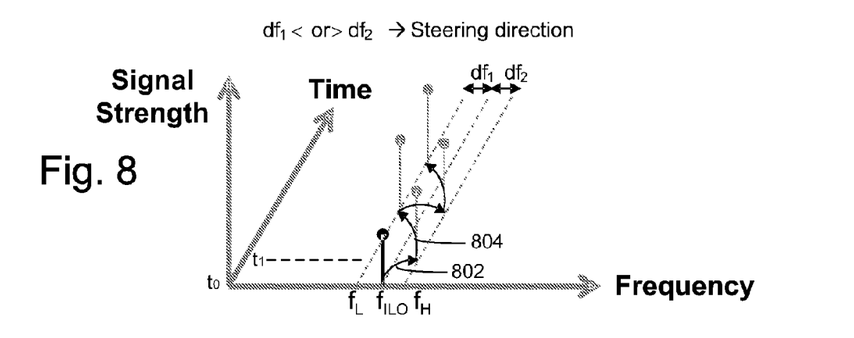
FIG. 8 represents a graphical illustration of iterative steps of the tracking method of FIG. 7 toward converging on a target direction.

FIG. 8 illustrates two iterations of the method described above in a graphical manner for a time multiplexed implementation. Setting frequency along the X-axis, time along the Y-axis, and Signal Strength represented by the Z-axis. For example, beginning with time $t_0$, and direction $\phi_1$, the maximum offset from $f_{ILO}$ is toward $f_H$, indicated by the arrow at 802. The next iteration at timeslot $t_1$ shows that for the ILO frequency $f_{ILO}$, the maximum offset at that point is with $f_L$, shown by arrow 804. The direction of transmission for $f_H$ and $f_L$ are changed until resulting $f_{ILO}$ lies midway between the $f_L$ and $f_H$.

Although a time-multiplexed implementation is described above, an alternative embodiment facilitates simultaneous transmission/reception of multiple beacons exhibiting the same polarization.

Figure 9A:
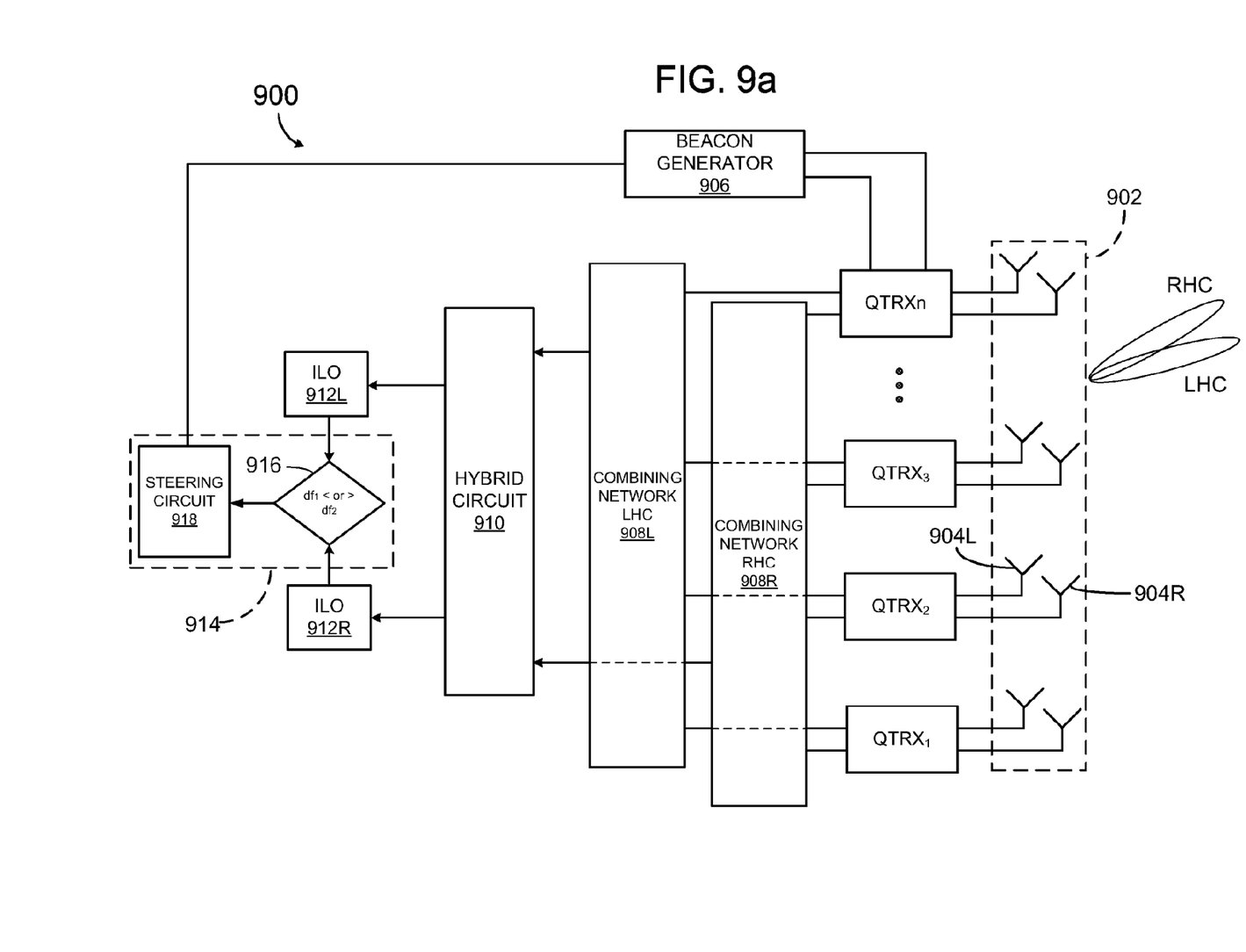
FIG. 9*a* illustrates a further embodiment of a transceiver and antenna interface circuit similar to FIGS. 2 and 6, but utilizing pairs of beacons that are simultaneously transmitted with different polarizations.

FIG. 9a illustrates a further embodiment of a transceiver circuit and antenna interface, generally designated 900, similar to that described above with respect to FIGS. 2 and 6, but employing the capability to transmit and receive beacons over multiple frequencies simultaneously. This provides a way to effectively suppress background reflections from interfering with direct reflections from a target device. The circuit includes an antenna 902 that in one embodiment takes the form of respective pairs of antenna elements 904L and 904R, configured to transmit and receive beacons exhibiting multiple polarizations. In one specific embodiment, pairs of beacons RHC and LHC are generated by a beacon generator 906 with different carrier frequencies $f_H$ and $f_L$ and respective right-hand and left-hand circular polarizations. The antenna elements 904L and 904R couple to a plurality of quadrature transceivers $QTRX_1$-$QTRXn$ which provide the directional phase information relating to beacons transmitted and/or received by the antenna elements. Respective combining networks 908L and 908R (for the respective left and right-hand polarization beacons) couple to the quadrature transceivers and feed reflected beacons to a hybrid circuit 910.

Further referring to FIG. 9a, in one embodiment, the hybrid circuit 910 takes the form of a hybrid coupler that separates reflected signals corresponding to the two beacons at carrier frequencies $f_H$ and $f_L$. Once separated, the two reflected signals are fed to respective ILO circuits 912L and 912R where respective lock/not locked signals are generated. The processing circuitry 914 evaluates the direction and frequency information by monitoring each of the ILOs to determine the maximum frequency offset for a constant loop gain. In one embodiment, the processing circuitry 914 includes determination logic 916 that evaluates the direction and offset information to identify the maximum beacon frequency offset value (with respect to the beacon pair). A steering circuit 918 in the processing circuitry processes the information and controls the beacon generator 906 in generating a subsequent iteration of beacons having frequencies and directions steered in the direction of the determined maximum frequency offset, as more fully explained below.

Figure 9B:
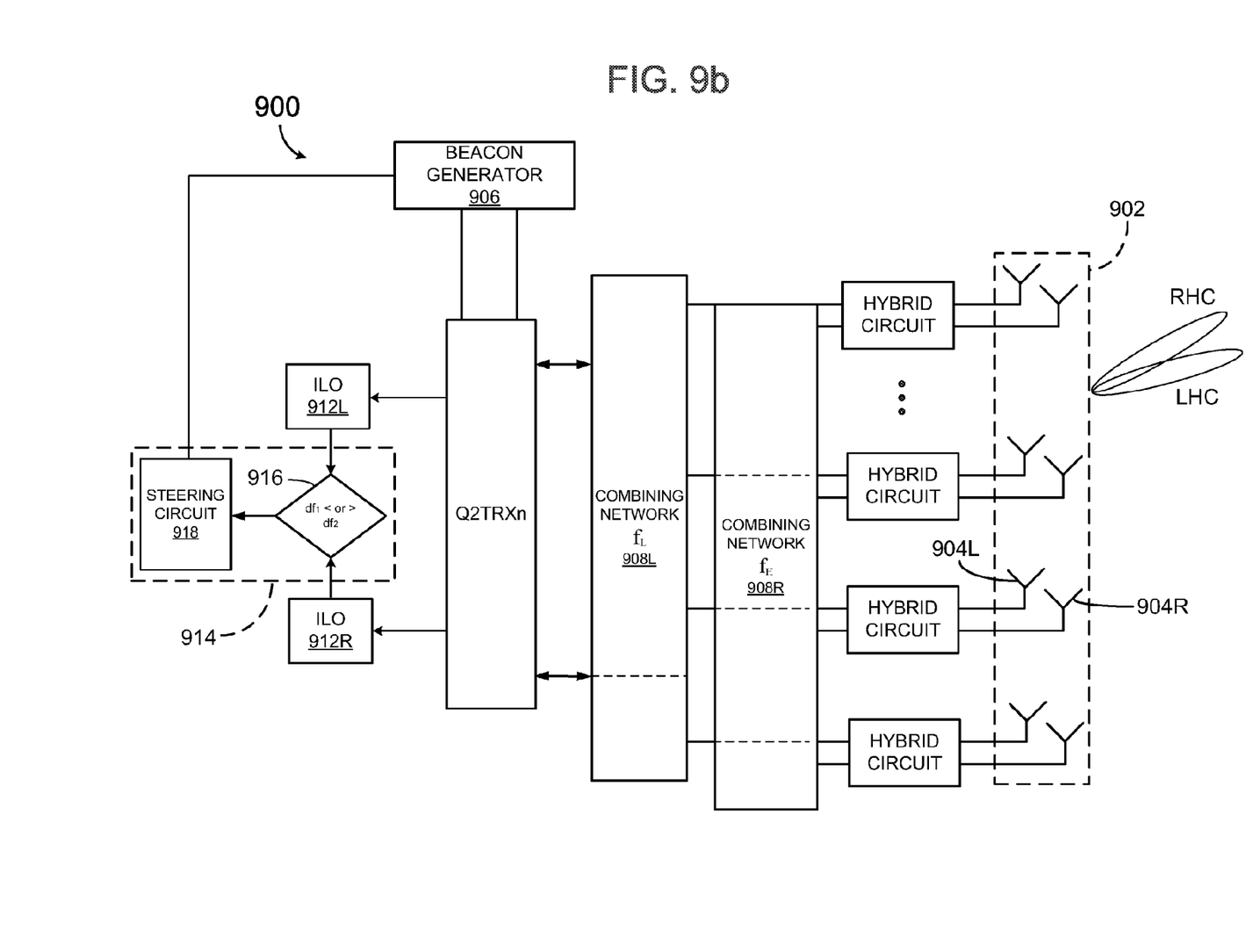
FIG. 9*b* illustrates an additional embodiment of a transceiver and antenna circuit similar to FIG. 9*a*.

FIG. 9b illustrates an alternative embodiment similar to that shown in FIG. 9a, but instead of utilizing a plurality of quadrature transceiver circuits between the combining networks 908R and 908L and the antennas, a plurality of hybrid circuits are employed, with the quadrature transceiver functionality instead positioned between the injection-locked-oscillator circuits 912L and 912R and the combining networks 908L and 908R.

Figure 10A:
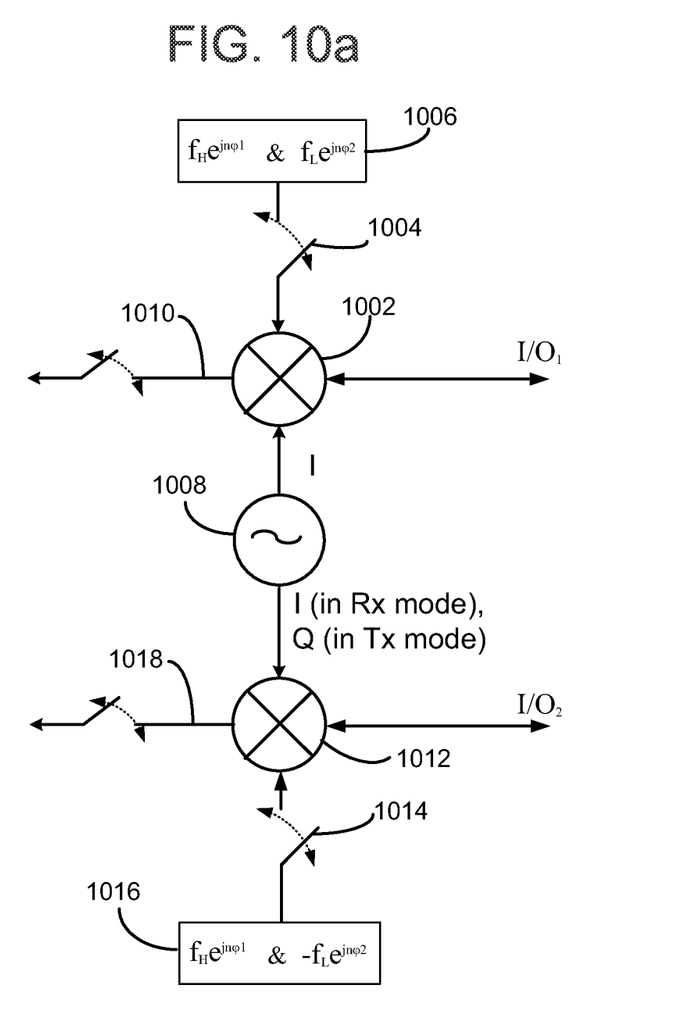
FIG. 10*a* illustrates further detail of the quadrature transceiver circuit of FIG. 9.

FIG. 10a illustrates further detail of one embodiment of a quadrature transceiver QTRXn employed in FIG. 9a. The transceiver includes a first mixer 1002 having a first switchable input 1004 to receive/transmit a beacon signal in accordance with a first polarization ($f_H e^{jn\Phi 1}$ & $F_L e^{jn\Phi 2}$) from a first portion 1006 of the beacon generator 906. The mixer 1002 also couples to a first antenna element $P_1$, and a local oscillator 1008. The mixer includes a receive output path 1010 that is selectively activated to pass IF reflected beacons of a first polarization resulting from received beacons locally mixed with the local oscillator frequency.

Further referring to FIG. 10a, the quadrature transceiver QTRXn further includes a second mixer 1012 having a switchable input at 1014 from a second portion 1016 of the beacon generator 906. The second mixer 1012 couples to a second antenna element P2 and the local oscillator 1008. A receive output path 1018 selectively passes IF reflected beacons of the second polarization locally mixed with the local oscillator frequency. In a specific embodiment, the antenna elements P1 and P2 are associated with linear X and Y polarizations that cooperate with a predetermined signaling scheme and a respective quadrature transceiver QTRXn to generate respective right hand circularly polarized (RHCP) and left hand circularly polarized (LHCP) beacons.

Figure 10B:
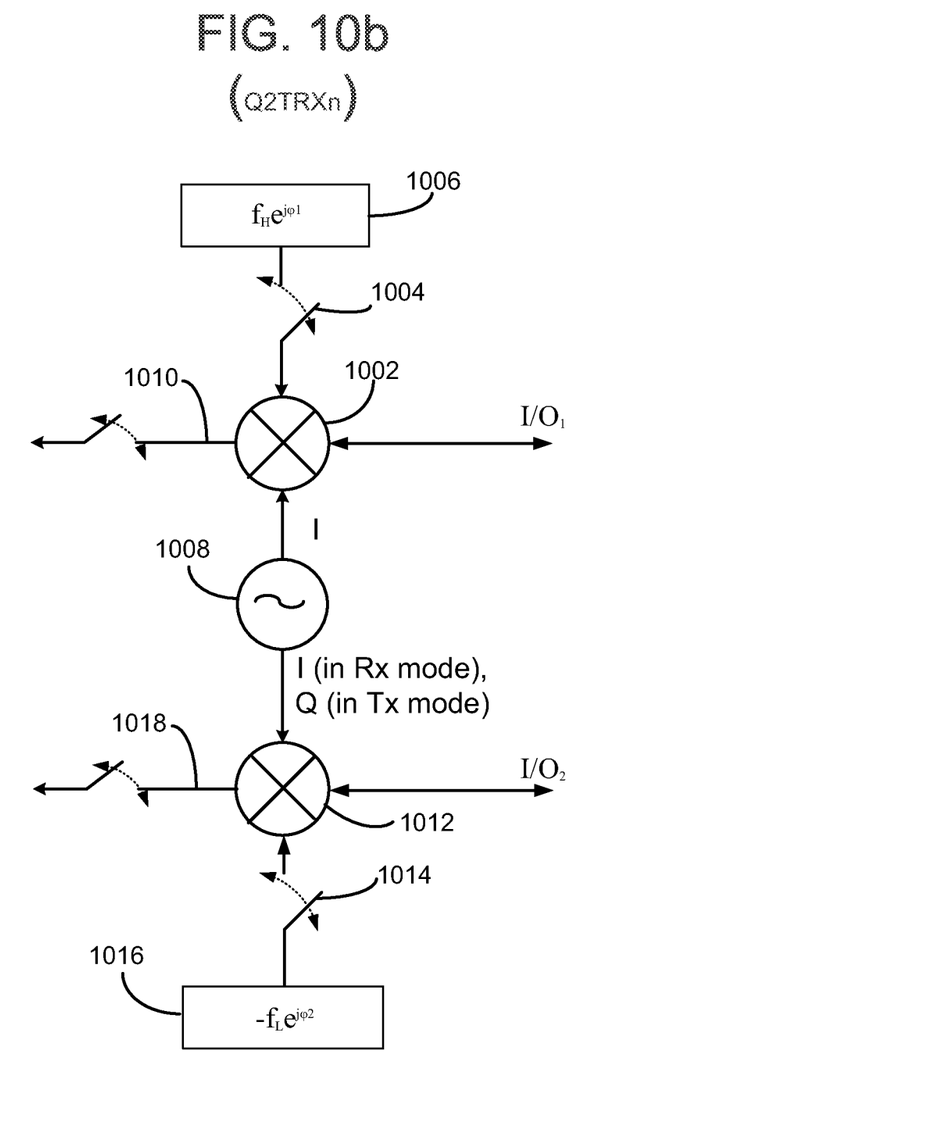
FIG. 10*b* illustrates an alternative embodiment of the quadrature transceiver circuit of FIG. 9.

FIG. 10b illustrates an alternative embodiment of a quadrature transceiver employed in FIG. 9b. The structure is similar to that of the transceiver of FIG. 10a, with the difference in terms of the signals input into the mixers 1002 and 1012. This is due to the relative differences in positioning of the transceivers (front-end in FIG. 9a versus back-end in FIG. 9b).

Figure 11:
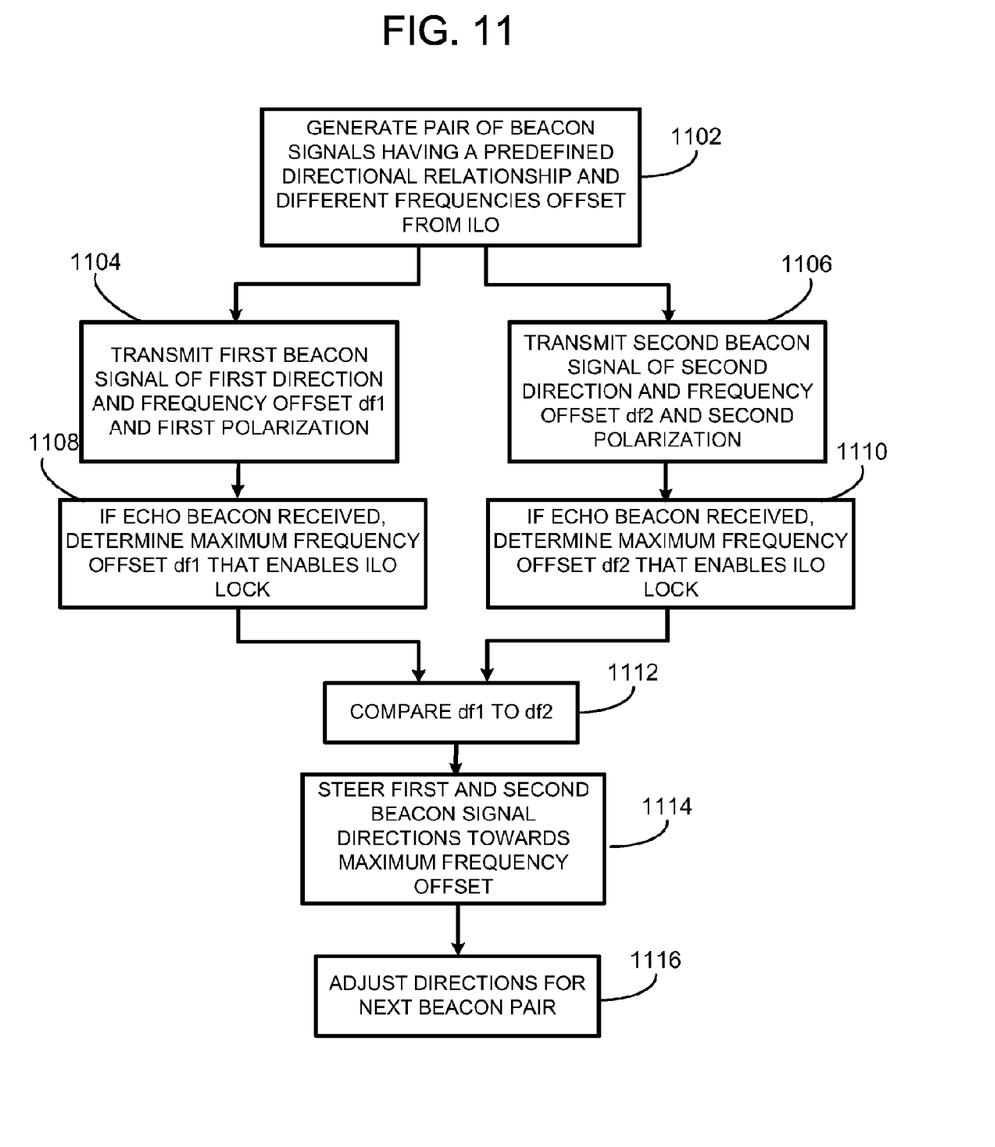
FIG. 11 illustrates a flow diagram of a target location search method similar to FIGS. 4 and 7, but utilizing the transceiver and antenna interface circuitry of FIGS. 9 and 10.

In operation, the transceiver and antenna interface circuitry carries out a search algorithm to locate the target device with multiple simultaneously transmitted beacons. FIG. 11 illustrates a high-level flowchart setting forth one embodiment of the search algorithm steps. At step 1102, a pair of beacon signals are generated having a predefined directional relationship and different carrier frequencies offset from the ILO. Further, the beacons exhibit different polarizations that enable them to be generated and transmitted simultaneously. A first beacon signal of a first direction and frequency offset df1 is transmitted during a given time interval, at step 1104. Simultaneous with the first beacon transmission, a second beacon is transmitted having a second associated direction and frequency offset df2 during the same time interval, at step 1106. For the first beacon, if a corresponding echo or reflection beacon is received, a determination is made as to the maximum frequency offset df1 that still enables a locking condition for the ILO, at step 1108. This involves producing an intermediate frequency (IF) version of the reflection, and feeding the IF version of the reflected beacon to the ILO for locking. If the ILO locks, then the steps are iterated until the maximum frequency offset is reached where the ILO fails to lock. This value of df1 is stored in memory.

Determining the first offset value df2 is carried out in parallel with a determination of whether a reflection from the second beacon was received, and determining the maximum frequency offset df2 that enables ILO lock, at step 1110, similar to the steps above for the first reflected beacon. Once the both beacon offset values df1 and df2 are determined, a comparison is made, at step 1112, to detect which offset value is larger, indicating a higher signal strength. The results of the comparison are then used to steer the beacon signal in the direction of the beacon that had the higher offset value, at step 1114, and then the direction for the next beacon pair are adjusted, at step 1116. This process iterates until convergence on a particular beacon direction, where df1 and df2 are substantially equal, which identifies the location of the target device.

Although multiple polarizations are described in the above embodiment as one way to transmit and receive multiple beacons simultaneously, thereby improving immunity to background scattering, multiple antenna arrays may be employed as an alternative to generating beacons with multiple polarizations.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, path widths, processing or operating frequencies, component circuits or devices and the like may be different from those described above in alternative embodiments. Also, the interconnection between circuit elements or circuit blocks shown or described as multi-conductor links may alternatively be single-conductor links, and single conductor links may alternatively be multi-conductor links. Links and signaling paths shown or described as being single-ended may also be differential, and vice-versa. Similarly, links described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. An electronic device for wirelessly tracking the position of a second electronic device, the electronic device comprising:
   transceiver circuitry including
      a beacon generator to generate a pair of beacons, wherein a first beacon of the pair of beacons has a first direction and a first frequency, and wherein a second beacon of the pair of beacons has a second direction and a second frequency, the first frequency and the second frequency being offset from a natural oscillator frequency; and
      an antenna array to transmit the pair of beacons, and to receive at least one reflected beacon from the second electronic device, wherein the at least one reflected beacon is received if a position of the second electronic device lies within a range of directions of at least one of the pair of beacons; and
      an injection-locked oscillator having the natural oscillator frequency, the injection-locked oscillator having an input coupled to the antenna array to receive the at least one reflected beacon, and to lock to the at least one reflected beacon when the at least one reflected beacon has a frequency value within locking range of the oscillator; and
   processing circuitry coupled to the transceiver circuitry to track the position of the second device based on a lock condition of the oscillator.

2. The electronic device according to claim 1 wherein the the beacon generator generates a plurality of additional beacons that sweep through a range of frequency values offset from the natural frequency of the oscillator, and wherein the antenna array transmits the plurality of additional beacons.

3. The electronic device according to claim 1 wherein the processing circuitry identifies the position of the second electronic device based on a selected reflected beacon of the at least one reflected beacon that exhibits a largest beacon frequency offset from the natural oscillator frequency of the oscillator while maintaining the lock condition with the oscillator.

4. The electronic device according to claim 1 wherein the antenna array comprises a phased-array antenna.

5. The electronic device according to claim 1 wherein the second electronic device comprises a wireless mobile gaming controller.

6. The electronic device according to claim 1 embodied as a game console unit.

7. The electronic device according to claim 1 wherein the antenna array transmits the first beacon during a first time slot within a time interval, and transmits the second beacon during a consecutive second time slot immediately following the first time slot.

8. The electronic device according to claim 1 wherein the antenna array transmits the first and second beacons simultaneously.

9. The electronic device according to claim 1 wherein the first beacon exhibits a first polarization and the second beacon exhibits a second polarization different from the first polarization.

10. The electronic device according to claim 1 wherein the processing circuitry identifies the position of the second electronic device based on a selected reflected beacon of the at least one reflected beacon that exhibits a maximum offset frequency for a constant loop gain.

11. The electronic device according to claim 1 wherein the beacon generator generates a plurality of additional beacons that sweep through a range of frequency values offset from the natural frequency of the oscillator, wherein the antenna array transmits the plurality of additional beacons, and wherein the processing circuitry identifies the position of the second electronic device based on a selected reflected beacon of the at least one reflected beacon that exhibits a largest beacon frequency offset from the natural oscillator frequency of the oscillator while maintaining the lock condition with the oscillator.

12. A wireless system for establishing a position of a second device with respect to a first device, the wireless link comprising:
   a first transceiver circuit in the first device including
      a beacon generator to generate a beacon at a particular frequency and direction,
      an antenna to transmit the beacon and, where the second device lies within a range of directions of the beacon, receive a reflected beacon, and an injection-locked oscillator having an input coupled to the antenna to lock to the reflected beacon when the reflected beacon has a frequency value within a locking range of the oscillator; and a second transceiver circuit in the second device including a reflective antenna to receive the beacon of a beacon frequency from a first direction and reflect the beacon as the reflected beacon in an opposite direction, wherein the second transceiver circuit iteratively sweeps through a plurality of beacon directions and for each direction generates tones at respective frequencies offset from a predefined frequency.

13. The wireless system according to claim 12 wherein the injection-locked oscillator generates an oscillator signal at the predefined frequency, and the beacon has a selectable frequency value offset from the predefined frequency.

14. The wireless system according to claim 12 and further including processing circuitry to identify the position of the second device from among the plurality of beacon directions based on determining a selected beacon direction having a largest offset frequency while satisfying a locked state with the injection-locked oscillator.

15. The wireless link according to claim 12 wherein the reflective antenna comprises a retro-directive antenna array.

16. A method of tracking a second electronic device with respect to a first electronic device, the method comprising:
    setting an oscillator signal for an injection-locked oscillator to a natural frequency value;
    transmitting a plurality of beacons each having different directions and different beacon frequencies, each of the different beacon frequencies offset from the natural frequency value by a different offset value;
    receiving a plurality of reflected beacons corresponding to one or more of the plurality of transmitted beacons when the second electronic device lies within a range of the different directions of the plurality of beacons;
    injecting each of the plurality of reflected beacons into the injection-locked oscillator;
    locking to one or more of the plurality of reflected beacons that have frequency values within locking range of the injection-locked oscillator; and
    determining a reflected beacon direction associated with a selected reflected beacon that exhibits a largest frequency offset that locks to the injection-locked oscillator.

17. The method according to claim 16 and further including:
    generating a plurality of additional beacons, each having different directions and different offset frequency values;
    transmitting the plurality of additional beacons in different directions;
    receiving an additional reflected beacon corresponding to at least one of the plurality of additional beacons when the second electronic device lies within a range of directions of at least one of the additional beacons;
    injecting the additional reflected beacon into the injection-locked oscillator.

18. A method of tracking a second electronic device with respect to a first electronic device, the method comprising:
    setting an oscillator signal for an injection-locked oscillator to a natural frequency value;
    sequentially transmitting a pair of beacon components in different directions at consecutive time slots within a given time interval, each of the beacon components having different frequency offsets with respect to the oscillator natural frequency;
    receiving a reflected beacon corresponding to at least one of the transmitted beacon components when the second electronic device lies within a range of directions of at least one of the transmitted beacon components;
    injecting the received reflected beacon into the injection-locked oscillator;
    locking to the reflected beacon when the reflected beacon has a frequency value within locking range of the oscillator.

19. The method according to claim 18, further including:
    generating a plurality of additional beacons, each of the plurality of additional beacons having different directions and different offset frequency values;
    transmitting the plurality of additional beacons in different directions;
    receiving an additional reflected beacon corresponding to at least one of the plurality of additional beacons when the second electronic device lies within a range of directions of at least one of the additional beacons;
    injecting the additional reflected beacon into the injection-locked oscillator.

* * * * *